(12) United States Patent
Sierra et al.

(10) Patent No.: US 7,208,735 B2
(45) Date of Patent: Apr. 24, 2007

(54) PROCESS FIELD DEVICE WITH INFRARED SENSORS

(75) Inventors: Gabriel Lazaro Sierra, Minneapolis, MN (US); Marcos Antonio Peluso, Chanhassen, MN (US); Loren Michael Engelstad, Norwood, MN (US); William Thomas Anderson, Chanhassen, MN (US)

(73) Assignee: Rosemount, Inc., Eden Prairie, MN (US)

( * ) Notice: Subject to any disclaimer, the term of this patent is extended or adjusted under 35 U.S.C. 154(b) by 45 days.

(21) Appl. No.: 11/148,096

(22) Filed: Jun. 8, 2005

(65) Prior Publication Data

US 2006/0278827 A1   Dec. 14, 2006

(51) Int. Cl.
*G01J 5/00* (2006.01)
(52) U.S. Cl. .................................... 250/338.1
(58) Field of Classification Search ............... 250/338.1
See application file for complete search history.

(56) References Cited

U.S. PATENT DOCUMENTS

| | | |
|---|---|---|
| 4,831,258 A | 5/1989 | Paulk et al. |
| 5,081,359 A | 1/1992 | Pompei |
| 5,764,684 A | 6/1998 | Pompei |
| 5,803,604 A | 9/1998 | Pompei |
| 6,043,493 A | 3/2000 | Kim et al. |
| 6,473,710 B1 | 10/2002 | Eryurek |
| 6,574,515 B1 | 6/2003 | Kirkpatrick et al. |
| 6,617,581 B2 | 9/2003 | Pompei |
| 6,711,446 B2 | 3/2004 | Kirkpatrick et al. |
| 2002/0169582 A1 | 11/2002 | Eryurek et al. |
| 2004/0065829 A1* | 4/2004 | Burk et al. ............ 250/339.07 |
| 2004/0158334 A1 | 8/2004 | Kirkpatrick et al. |
| 2005/0080493 A1* | 4/2005 | Arntson ....................... 700/39 |

* cited by examiner

*Primary Examiner*—David Porta
*Assistant Examiner*—Christopher Webb
(74) *Attorney, Agent, or Firm*—Kinney & Lange, P.A.

(57) ABSTRACT

Infrared radiation from a plurality of locations associated with a process is measured by a field device, which includes a plurality of input channels, a plurality of IR sensors, and a data processor. The infrared radiation from the locations associated with the process is received by the input channels and the intensity of the infrared radiation is measured by the IR sensors to produce representative sensor signals. The data processor produces an output as a function of selected sensor signals.

20 Claims, 8 Drawing Sheets

PROCESS FIELD DEVICE WITH INFRARED SENSORS

BACKGROUND OF THE INVENTION

The present invention relates to process devices. More specifically, the present invention relates to field-mounted process control, monitoring, and measurement devices.

Process devices are used in industrial processes to obtain information associated with the operation of the processes. Sensors located inside the process devices, or in communication with the process devices, are employed to measure process variables representative of conditions associated with the industrial processes. Examples of process variables include temperature, pressure, flow, density, viscosity, pH, conductivity, product level, turbidity, vibration, position, analyte concentration and any other chemical or physical property associated with the process.

Process devices are used to monitor process variables, for example, in chemical, gas, petroleum, and pharmaceutical plants. Typically, the process devices are mounted on tanks, pipes, or other vessels associated with the processes. The process devices are often configured to transmit a signal representative of a process variable to a control room or other process system.

There is a continuing need for more effective sensing strategies to meet the process variable monitoring needs of the process control industry.

BRIEF SUMMARY OF THE INVENTION

The present invention includes a field device for monitoring infrared radiation associated with locations of a process. The field device includes a plurality of input channels to receive infrared radiation from the locations associated with the process and a plurality of infrared sensors to produce sensor signals representative of the intensities of the infrared radiation. The field device produces an output as a function of selected sensor signals.

DETAILED DESCRIPTION

The present invention includes a field device for receiving and measuring infrared radiation emitted from a plurality of locations associated with a process. The field device produces an output as a function of infrared radiation received from selected locations associated with the process.

Figure 1:
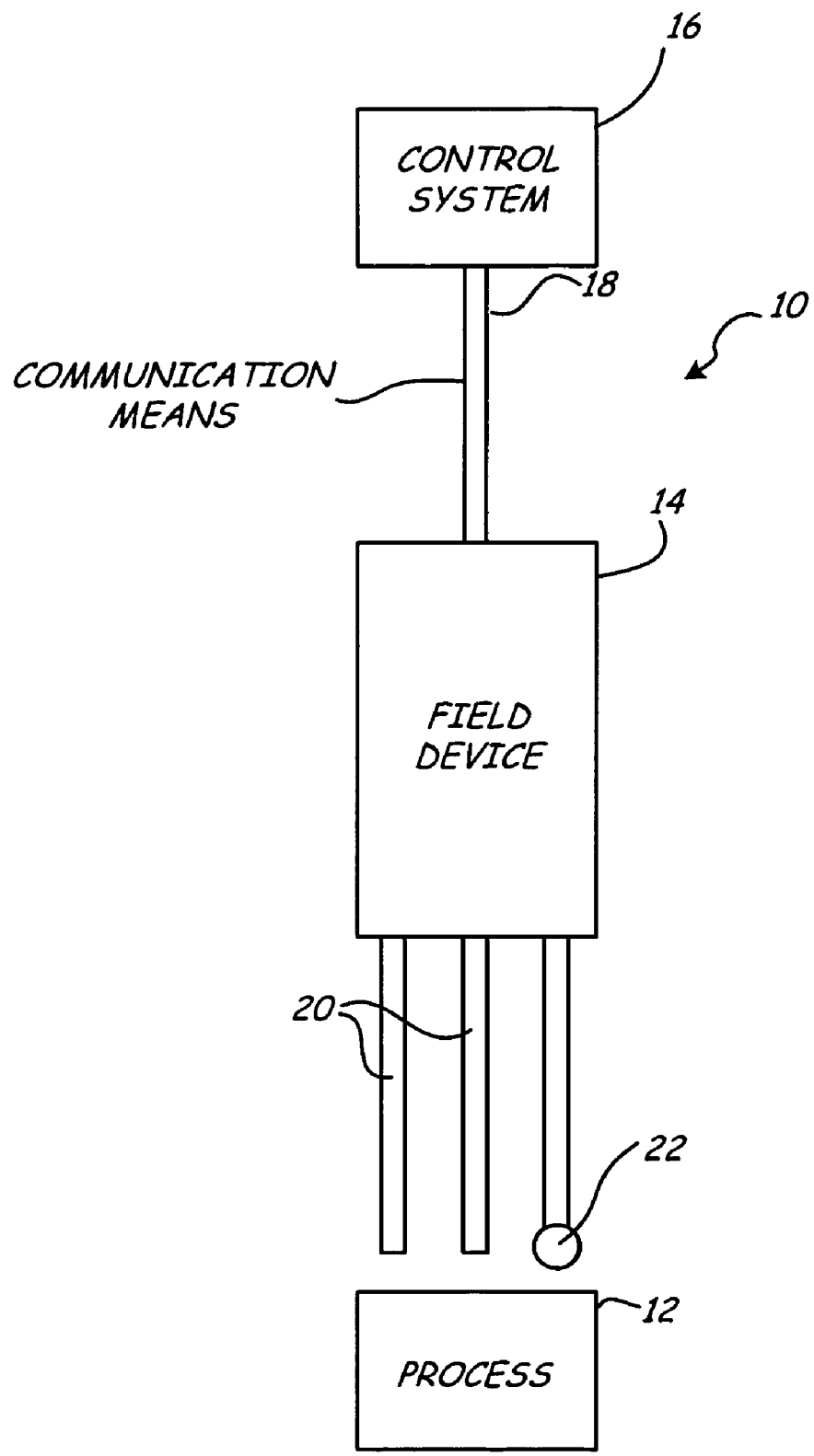
FIG. 1 is a block diagram of one embodiment of a process control system of the present invention.

FIG. 1 shows a block diagram representation of process control system 10 for use in monitoring process variables associated with process 12. Process control system 10 includes field device 14 of the present invention, control system 16, and communication means 18, which facilitates communication between field device 14 and control system 16.

As shown in FIG. 1, field device 14 is in communication with a plurality of optical waveguides 20 and an optional physical sensor 22. Optical waveguides 20 receive infrared radiation from locations associated with process 12 and transmit the infrared radiation to field device 14. A plurality of infrared radiation sensors (IR sensors) are included within field device 14 to measure the intensity of the transmitted infrared radiation. Field device 14 produces an output as a function of selected infrared radiation intensities and/or physical sensor signals received from optical waveguides 20 and/or physical sensor 22. The output may be communicated (via communication means 18) to control system 16, which may be a control room, another field device, or any other process control component or process control system.

Examples of outputs that may be produced by field device 14 include differential temperatures, average temperatures, midpoint temperatures, temperature profiles, aggregate temperatures, gas concentrations, differential gas concentrations, level detect indications, leak indications, flow rates, condensation indications, and diagnostic outputs (such as, for example, indications of sensor malfunction).

Communication means 18 may be a process control loop, a wireless communication link, or any other communication means known in the art. Examples of suitable process control loops include a two-wire process control loop or a four-wire process control loop. Examples of suitable process control loop standards include the 4–20 mA standard, the HART® communication protocol, the FOUNDATION® Fieldbus communication protocol, the Profibus communication protocol, or any other process control loop standard known in the art.

In some embodiments, field device 14 is in communication with a plurality of optional physical sensors 22. Physical sensor 22 can be any type of sensor capable of measuring temperature, pressure, flow, density, viscosity, pH, conductivity, product level, turbidity, vibration, position, and any other chemical or physical property associated with process 12. In some embodiments, physical sensor 22 is a contact temperature sensor such as, for example, a thermocouple or a resistance temperature detector (RTD).

The operation of field devices can degrade and process device components can malfunction or fail over time, especially if process devices are exposed to harsh environments, which are often associated with industrial processes. All electrical components associated with a field device have the potential to malfunction or fail, including sensors. As illustrated in FIG. 1, the present invention includes several features that reduce the chances of sensor failure interrupting the measurement of a process variable. First, field device 14 includes a plurality of IR sensors, so if one IR sensor fails, one or more secondary IR sensors are available as a redundancy. In one embodiment, field device 14 is equipped with eight IR sensors so that seven IR sensors can function as backup sensors. Second, as illustrated in FIG. 1, field device 14 can communicate with one or more external physical sensors 22. As such, field device 14 can receive process variable data from sensors that may be spatially distant from field device 14 and/or that use different technologies or sensing principles than the internal IR sensors of field device 14. The ability of field device 14 to monitor the same type of process variable with different sensor technologies and/or measurement principles further reduces the chances of all sensors failing in response to the same distress, thereby providing an additional redundancy feature.

Another feature of the present invention is that it eliminates the need for including a transmitter for each sensor in a process control system. Instead of having an individual transmitter for transmitting a sensor signal/output for each sensor, a single field device 14 of the present invention can fulfill this role for a plurality of sensors. This feature can reduce installation, hardware, and maintenance costs (e.g., by reducing the amount of wiring) and reduce the number of potential points of failure in a process control system. In addition, unlike a transmitter communicating with a single sensor, field device 14 can produce outputs as a function of information received from a plurality of sensors.

Figure 2:
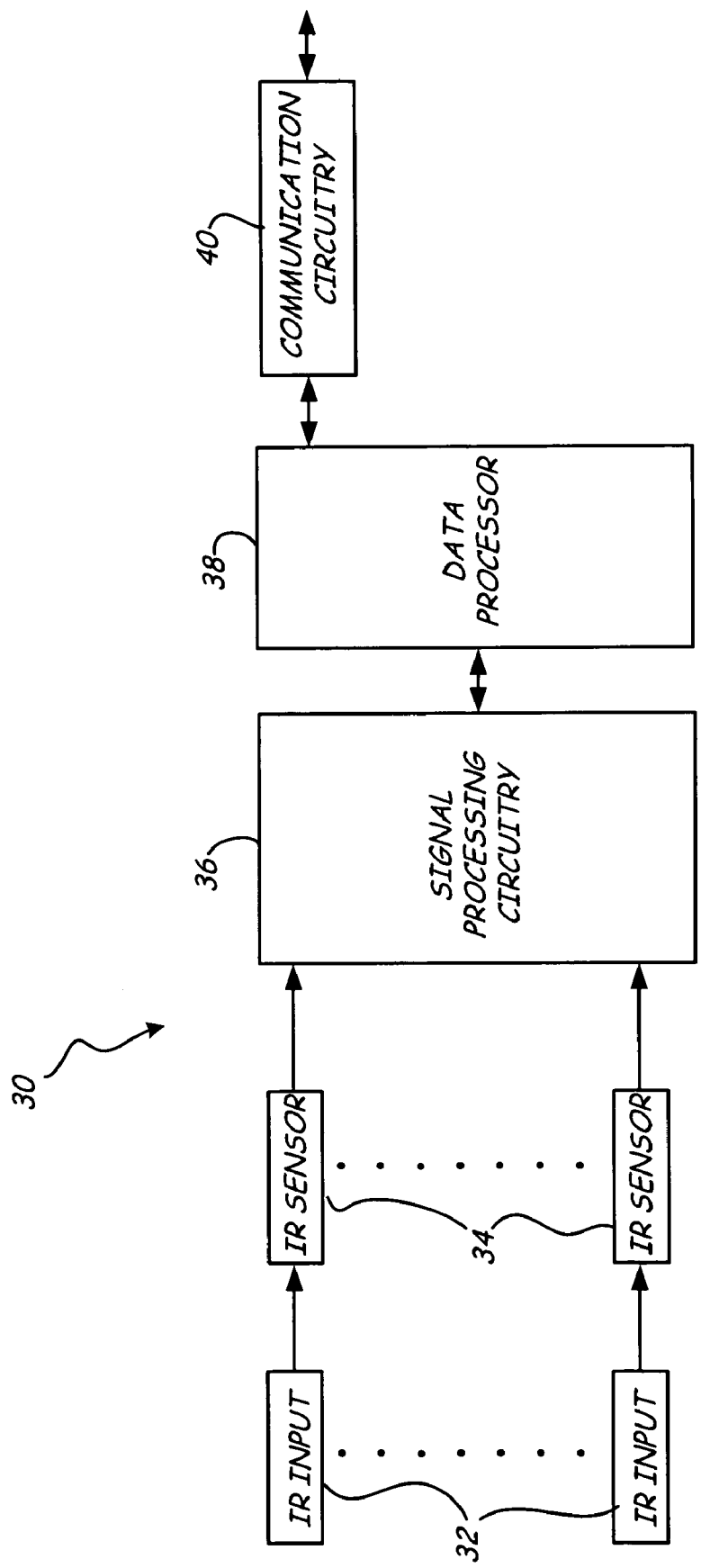
FIG. 2 is a block diagram of a field device of the present invention for use in the process control system of FIG. 1.

FIG. 2 shows a block diagram representation of field device 30 of the present invention. Field device 30 includes a plurality of input channels 32, a plurality of IR sensors 34, signal processing circuitry 36, data processor 38 and communication circuitry 40. Each of the plurality of input channels 32 is adapted to couple to an optical fiber (or optical waveguide) to receive infrared radiation from a location associated with process 12 of FIG. 1.

Each IR sensor 34 is connected to one or more of the plurality of input channels 32 to receive the infrared radiation from one or more of the input channels 32 and produce a sensor signal representative of the intensity of the infrared radiation. These sensor signals are transmitted to signal processing circuitry 36, which conditions the sensor signals for use by data processor 38. IR sensors 34 can be any type of infrared radiation sensor known in the art. For example, IR sensors 34 can be non-contact infrared radiation sensors such as thermopiles and photodiodes.

Data processor 38 produces an output as a function of selected sensor signals received from signal processing circuitry 36. The output may then be communicated to communication circuitry 40 for transmittal to communication system 16 via communication means 18. The term "data processor," as used herein, includes any circuit or combination of circuits that can perform a logic or counting function to control the operation of field device 14 or carry out instructions or necessary steps to produce an output as a function of the condition sensor signals. Examples of data processors include microprocessors, applications specific integrated circuits (ASICs), programmed gate arrays (PGAs), reduced instruction set computers, and any other suitable computation means known in the art. In one embodiment, data processor 38 is a microprocessor with associated memory.

Figure 3:
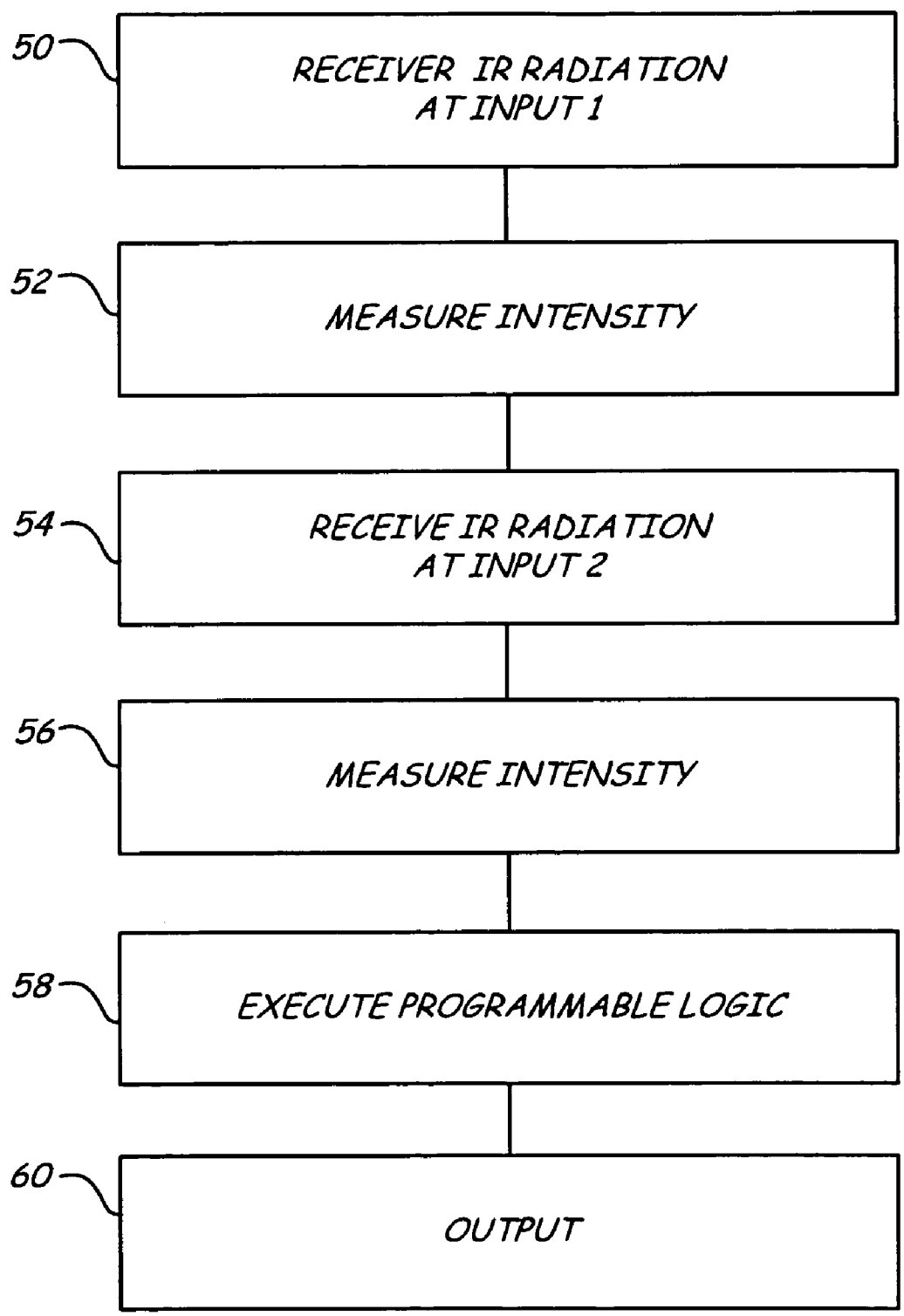
FIG. 3 is a flow chart of a method of the present invention for producing an output as a function of infrared radiation received from selected location associated with the process of FIG. 1.

FIG. 3 shows a flowchart of a method for producing an output representative of infrared radiation received from selected locations of process 12 of FIG. 1. Infrared radiation associated with a first location, or first set of locations, of process 12 is received by waveguides 20 and transmitted to field device 14. The infrared radiation is received at a first input channel 32 (step 50) and the intensity of the infrared radiation is measured by one of the IR sensors 34 (step 52) to produce a first sensor signal. At the same time (or a different time) infrared radiation associated with a second location, or second set of locations, of process 12 is received at a second input channel 32 (step 54) and the intensity of the infrared radiation is measured (step 56) by one of the IR sensors 34 to produce a second sensor signal. After the first and second sensor signals are conditioned by signal processing circuitry 36, data processor 38 executes programmable logic (step 58) to produce an output as a function of the conditioned sensor signals (step 60).

Examples of the programmable logic for generating the output include simple or complex algorithms, first order equation models, regression models, fuzzy logic systems, neural network models, polynomial curvefits, threshold circuitry, any other combination of instructions or logic steps known in the art, and any combination of these.

Figure 4:
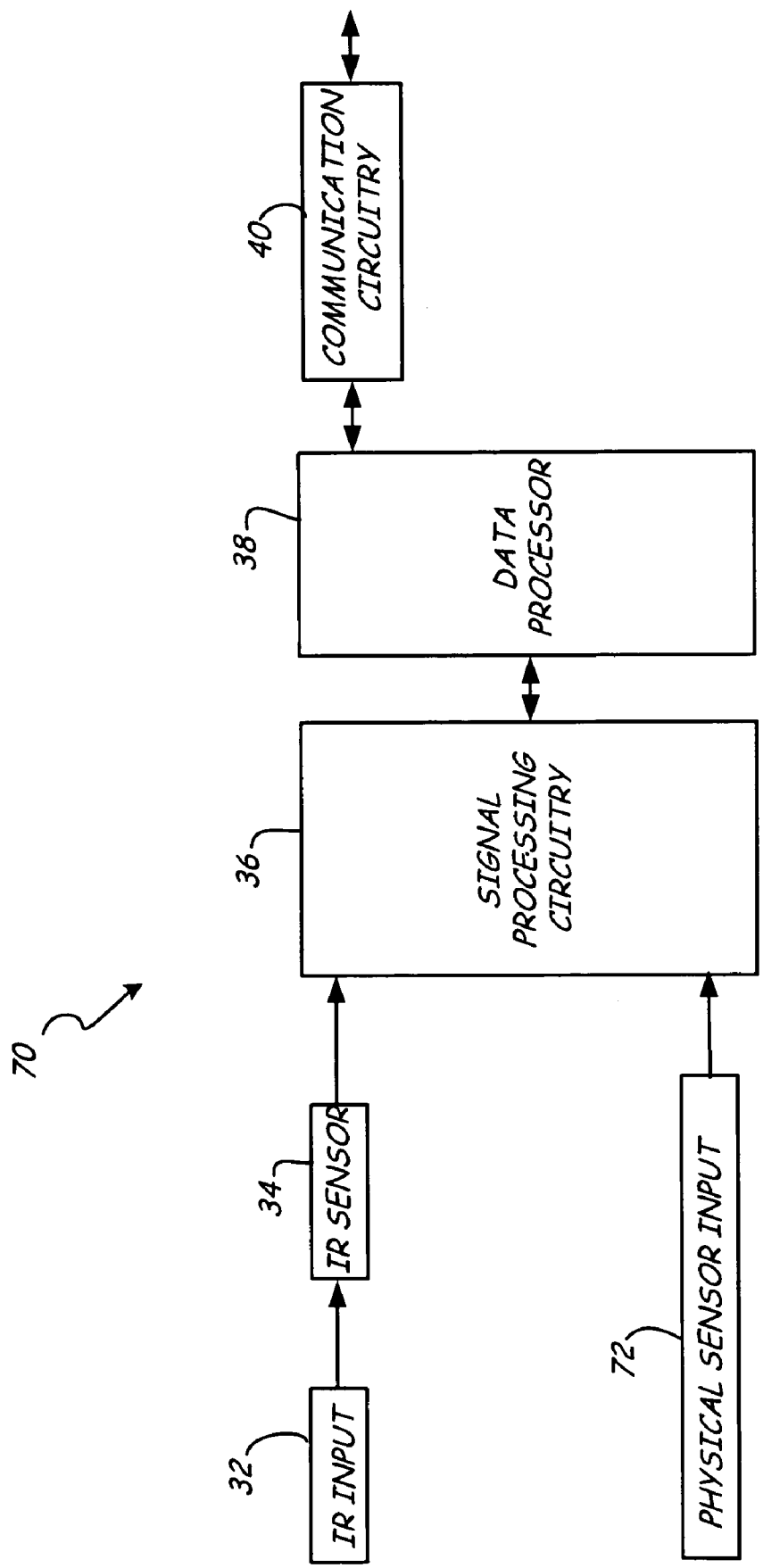
FIG. 4 is a block diagram of the field device of FIG. 2 equipped with a physical sensor input.

FIG. 4 shows a block diagram of field device 70, which is another embodiment of the present invention generally similar to that illustrated in FIG. 2. The difference, as illustrated in FIG. 4, is that field device 70 includes an input channel 72 for receiving a physical sensor signal from external physical sensor 22 (FIG. 1). As such, field device 70 can produce an output as a function of both infrared radiation received from selected location(s) of process 12 as well as physical sensor signals received from a physical sensor 22 positioned at a location associated with process 12.

In some embodiments, field device 70 is adapted to monitor a sensor signal received from IR sensor 34 and a physical sensor signal received through input channel 72 from a physical sensor 22 in the form of a non-IR temperature sensor. In this embodiment, data processor 38 of field device 70 compares the two sensor signals and automatically produces a diagnostic output if the comparison yields a value outside of a predetermined range. The diagnostic output can indicate when a sensor has failed or is not operating within desired accuracy tolerances. In one such embodiment, data processor 38 measures a differential value as a function of the two sensor signals to determine whether IR sensor 34 and the non-IR temperature sensor are both in satisfactory working condition. If the differential value falls outside a prescribed range of differential values, data processor 38 automatically outputs a diagnostic output that triggers an alarm or other notification.

Figure 5:
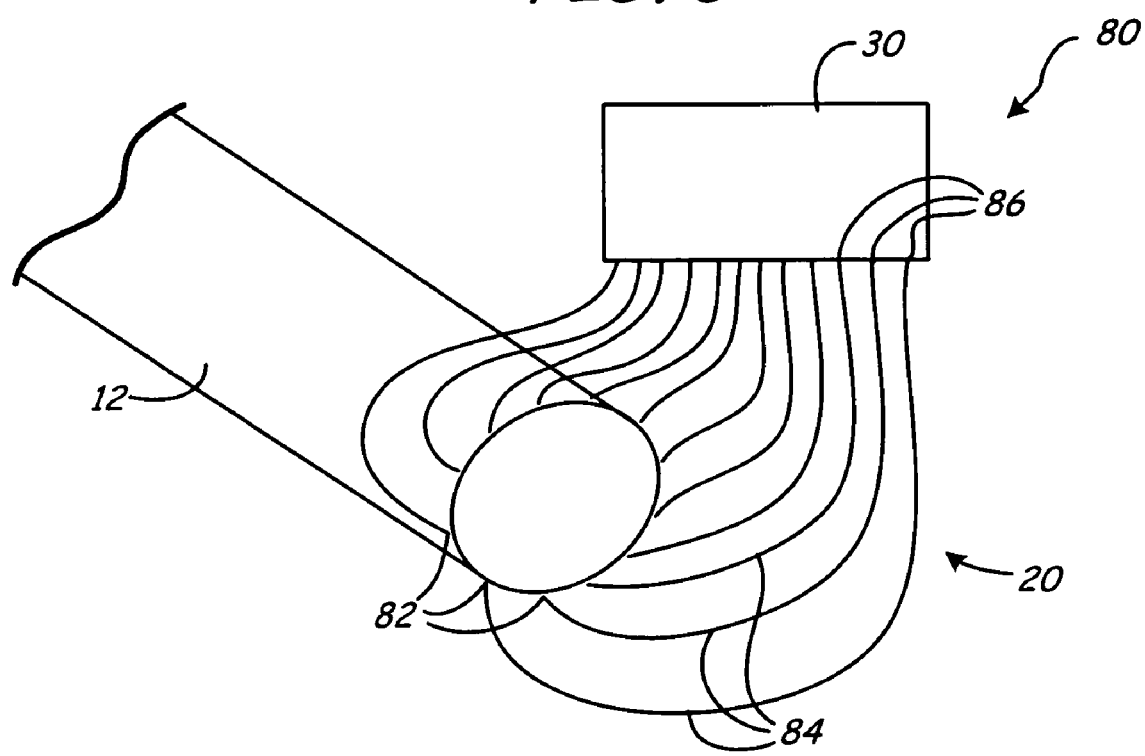
FIG. 5 is a simplified perspective view of a field device of the present invention including a plurality of separate optical waveguides.

FIG. 5 shows a field device system 80 of the present invention, which includes field device 30 of FIG. 2 communicating with a plurality of waveguides 20. As shown in FIG. 5, field device 30 includes at least eight input channels 32 for coupling to eight waveguides 20. Each waveguide 20 includes an optical fiber having input 82, optical path 84, and output 86. Each input 82 is located at a different location around the perimeter of process 12, which is a pipe as shown in FIG. 5. Inputs 82 are gapped from process 12 for non-contact sensing. Each waveguide 20 receives infrared radiation emitted from process 12 at input 82 and transmits the infrared radiation over a distance along optical path 84 to output 86, which is coupled to one of the input channels 32 (FIG. 2).

Field device 30 can include any number of IR sensors 34. In the embodiment of FIG. 5, field device 30 includes eight IR sensors (not shown), with each IR sensor connected to a single input channel 32 for receiving infrared radiation from a different waveguide 20. In this configuration, field device system 80 is equipped with seven backup sensors so that seven of the eight sensors can fail without preventing field device system 80 from monitoring at least one process variable associated with process 12. In addition, field device system 80 can measure process variables at eight different locations to create a profile of the process variable relative to process 12. This process variable profile may be used to monitor, for example, a distribution or height of a substance inside process 12 or a temperature distribution (or profile) within process 12. Alternatively, multiple inputs 82 can be located to monitor the same location of process 12 to provide multiple backup readings for that particular location.

In some embodiments, field device 30 is configured to compute various outputs as a function of infrared radiation received from selected locations of process 12. In the embodiment of FIG. 5, field device 30 can be configured to compute, for example, an output that represents an average value (e.g., average temperature), a midpoint value, or a differential value (e.g., differential temperature) as a function of infrared radiation received from all or a subset of the eight waveguides 20.

Figure 6:
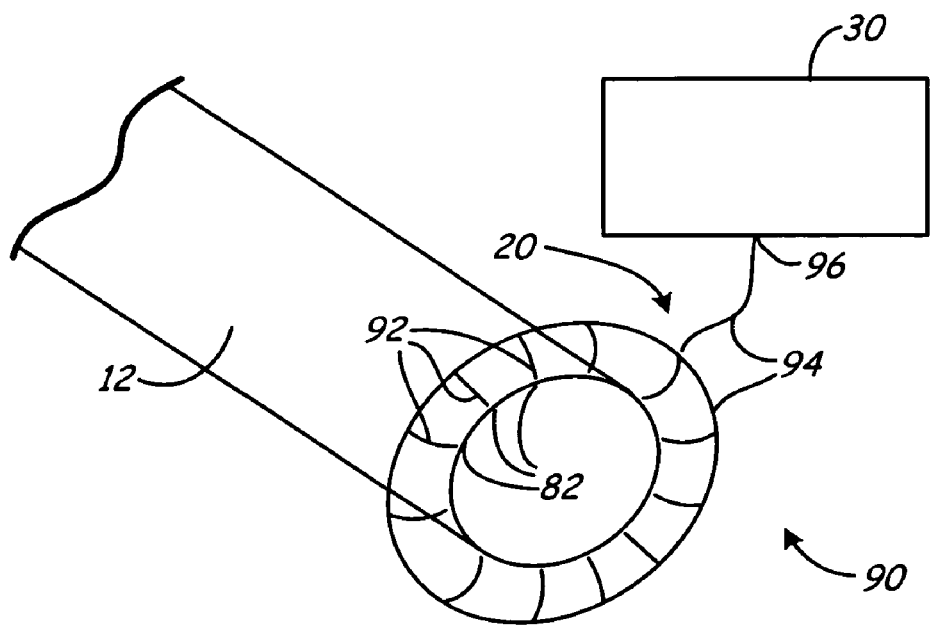
FIG. 6 is a simplified perspective view of a field device of the present invention having an optical waveguide that includes a plurality of optical fibers that share a common output.

FIG. 6 shows field device system 90 that, similar to field device system 80 of FIG. 5, includes field device 30 of FIG. 2 and one or more waveguides 20. As shown in FIG. 6, waveguide 20 includes optical inputs 82, optical fibers 92, aggregate optical path 94, and common output 96. Each optical fiber 94 has a different input 82 and communicates with aggregate optical path 94. As such, infrared radiation enters inputs 82 of optical fibers 92 from a plurality of locations associated with process 12 and travels along optical fibers 92 to aggregate optical path 94. The infrared radiation is then combined within aggregate optical path 94 and transmitted along aggregate optical path 94 to common output 96. Thus, the infrared radiation received by field device 30 is an aggregate (or sum) of the infrared radiation received at each of inputs 82. In one embodiment, aggregate optical path 94 is an optical fiber, and optical fibers 92 are spliced to optical path 94.

Waveguide 20 of system 90, thus, increases the number of locations field device 30 can monitor as compared to waveguide 20 of system 80. As shown in FIG. 6, each waveguide 20 can receive infrared radiation from eight different locations associated with process 12, whereas each waveguide 20 of FIG. 5 can receive infrared radiation from one location.

Compared to traditional infrared radiation collection systems used in the process control industry, waveguide 20 of the present invention can have a reduced angle of incidence, especially when input(s) 82 is located in close proximity to process 12. This reduced angle of incidence is due to the optical fiber collection system used by waveguide 20, which may provide a more discrete (or focused) infrared radiation sample with respect to process 12 than traditional infrared radiation collection systems which, due to their larger incident angles, tend to provide an infrared radiation sample that is more of an average. Likewise, due to their larger angles of incidence, traditional infrared radiation collection systems have a higher chance than waveguides 20 of the present invention of receiving infringing background radiation from sources other than process 12.

In some embodiments of systems 80 and 90, a selected portion of either (1) each of the plurality of optical paths 84 or (2) aggregate optical path 94 is secured to a carrier support. FIGS. 7–12 illustrate various embodiments of carrier supports for use with the present invention.

Figure 7:
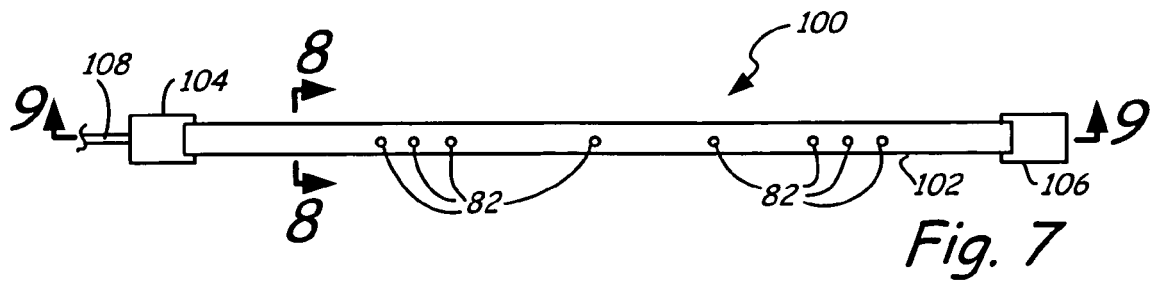
FIG. 7 is a bottom view of a waveguide belt of the present invention.

FIG. 7 shows a bottom view of waveguide belt 100, which includes strap 102, fasteners 104 and 106, inputs 82, and output 108. Fasteners 104 and 106 are located at opposite ends of strap 102. Inputs 82 are located at various locations along the length of strap 102 to receive infrared radiation from locations associated with process 12 and transmit the infrared radiation to output 108. In some embodiments, output 108 comprises an optical fiber or a plurality of optical fibers for transmitting infrared radiation to field devices of the present invention. Output 108 can be located at any location on belt 100 so long as it is in communication with optical fiber(s) 114.

Figure 8:
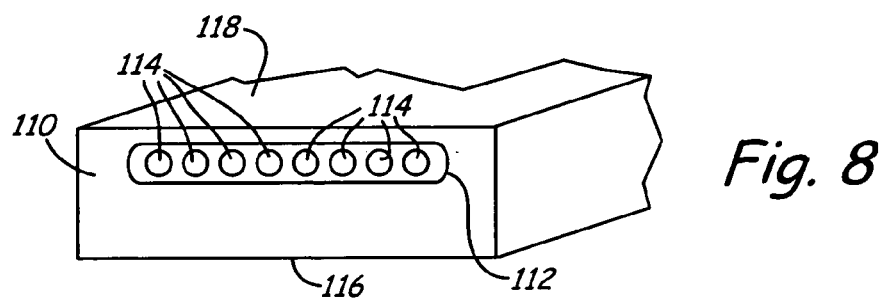
FIG. 8 is a sectional view as taken along line 8—8 of FIG. 7.

FIG. 8 shows a perspective cross-sectional view of belt 100 taken along line 8—8 of FIG. 7. As illustrated, strap 102 includes outer covering 110, cavity 112, and optical fibers 114. Outer covering 110 includes bottom face 116 and top face 118 and defines cavity 112, which provides a passage for optical fibers 114 to run the length (or a portion of the length) of strap 102. In some embodiments, strap 102 includes multiple cavities 112. Inputs 82 are located on bottom face 116.

Figure 9:
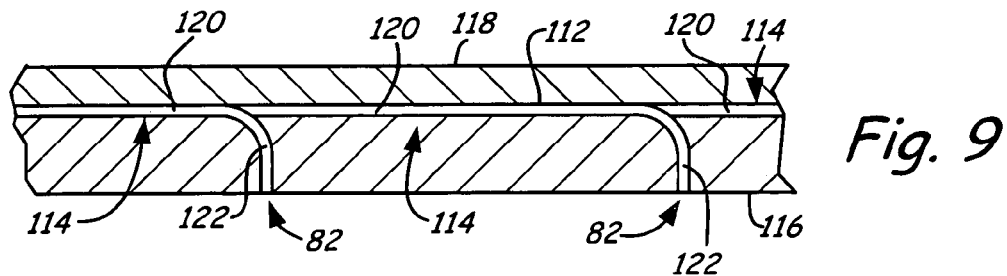
FIG. 9 is a sectional view as taken along line 9—9 of FIG. 7.

FIG. 9 shows a cross-sectional side view taken along line 9—9 of FIG. 7. Each optical fiber 114 includes longitudinal portion 120 and transverse portion 122. Each longitudinal portion 120 is positioned within cavity 112 and transverse portion 122 originates at longitudinal portion 120 and terminates at inlet 82 of bottom face 116.

Figure 10:
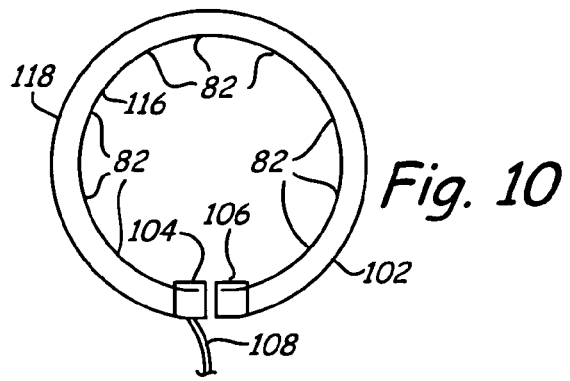
FIG. 10 is an end view of the waveguide belt of FIG. 7 in a closed loop configuration.

FIG. 10 shows an end view of belt 100, in which fasteners 104 and 106 are fastened together so that strap 102 forms a closed loop. This feature allows strap 102 to be secured around a pipe or other vessel of process 12 for mounting the carrier support relative to process 12 to position inputs 82 to receive infrared radiation from different locations of process 12, which allows for circumferential process variable profiling (e.g., circumferential temperature profiling). Strap 102 can be of any length to accommodate various sizes and shapes of process 12. In some embodiments, the length of strap 102 located between fasteners 104 and 106 is adjustable. Fasteners 104 and 106 can comprise any fastening or mounting devices known in the art.

Belt 100 can include any number of inputs 82 and optical fibers 114 in any orientation. In some embodiments, inputs 82 are equally spaced along bottom face 116 of strap 102 to receive infrared radiation at equally spaced circumferential locations of process 12. In other embodiments, two or more inputs 82 are clustered in the same general area of bottom face 116 to provide multiple data points for a location of process 12.

Figure 11A:
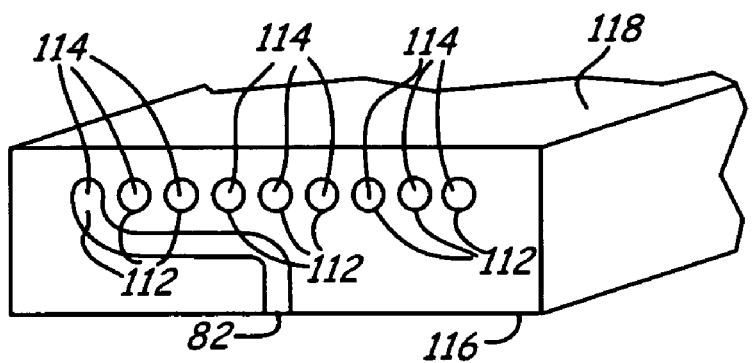
FIG. 11A is a cross-section of one embodiment of the waveguide belt of FIG. 7.
Figure 11B:
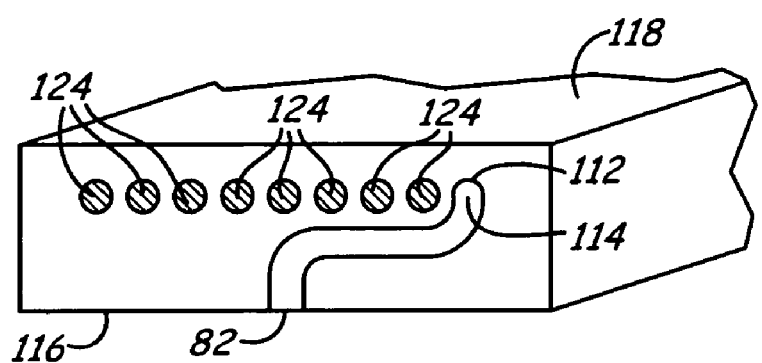
FIG. 11B is another cross-section of the embodiment of FIG. 11A.
Figure 11C:
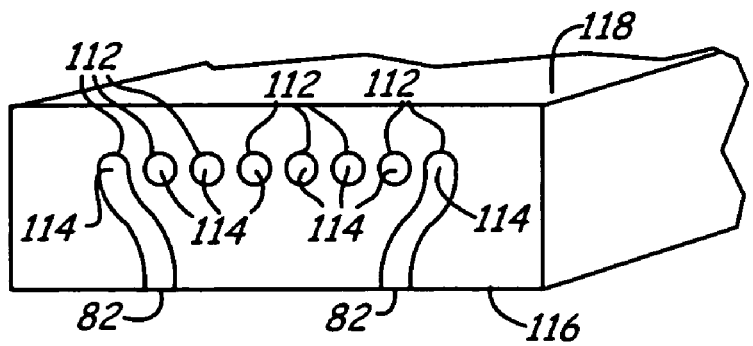
FIG. 11C is a cross-section of another embodiment of the waveguide belt of FIG. 7.

FIGS. 11A–11C show alternate embodiments of belt 100 of FIG. 7, with FIGS. 11A–11C each showing a cross-section of belt 100 taken in the transverse direction (similar to FIG. 8). As shown in FIGS. 11A–11C, each optical fiber 114 resides in a separate cavity 112 formed within strap 102. In some embodiments, strap 102 includes a plurality of cavities 112, with one or more cavities 112 housing a plurality of optical fibers 114.

FIG. 11A shows a cross-section taken near one end of strap 102 and FIG. 11B shows a cross-section taken near another end of strap 102. In the embodiment of FIGS. 11A and 11B, inputs 82 are generally centered on bottom face 116 and each cavity 112 is filled in after the optical fiber 114 residing within it has terminated at bottom face 116. As shown in FIG. 11B, filled-in cavities 124 are cavities 112 that have been filled-in with material after the optical fiber 114 associated with it has terminated at bottom face 116. In other embodiments, each cavity 112 is not filled in after the optical fiber(s) 114 residing within it have terminated at bottom face 116. Although FIGS. 11A and 11B show inputs 82 generally centered on bottom face 116 in the transverse direction, inputs 82 can also be located off-center.

As shown in FIG. 11C, in some embodiments, inputs 82 of two or more optical fibers 114 are located generally at the same longitudinal position along bottom face 116 of strap 102.

In some embodiments, one or more optical fibers 114 are equipped with a plurality of inputs 82. This can be accomplished by splicing multiple transverse portions 122 to a single longitudinal portion 120. Such splicing can be accomplished, for example, using optical couplers to mate separate optical fibers.

Belt 100 can be manufactured using various processes. For example, holes can be provided through a strap for locating inputs 82, optical fibers 114 can then be applied to and adhered to one side of the strap whereby an end of each optical fiber 114 is fed through one of the holes. An optional covering can then be applied to the face of the strap opposite inputs 82 to cover optical fibers 114. Alternatively, belt 100 can be formed using molding procedures or any other suitable methods known in the art.

Figure 12:
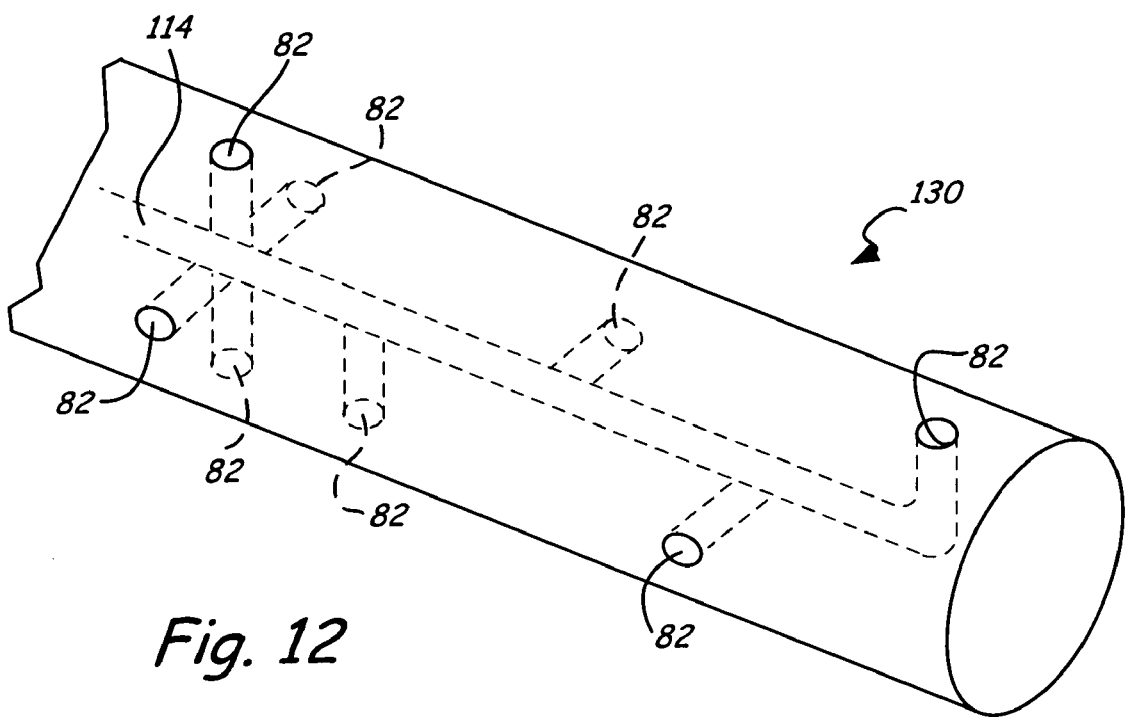
FIG. 12 is a perspective side view of one embodiment of a waveguide rod of the present invention.

In some embodiments, a carrier support can be configured for horizontal alignment relative to a pipe or other vessel of process 12 to horizontally align inputs 82 relative to process 12. FIG. 12 shows one such embodiment in the form of waveguide rod 130. As illustrated, rod 130 includes an internal optical fiber 114 having multiple inputs 82, some of which are staggered angularly and longitudinally relative to one another. Rod 100 can be of any length, include any number of inputs 82 in any orientation, and include any number of optical fibers 114.

Figure 13:
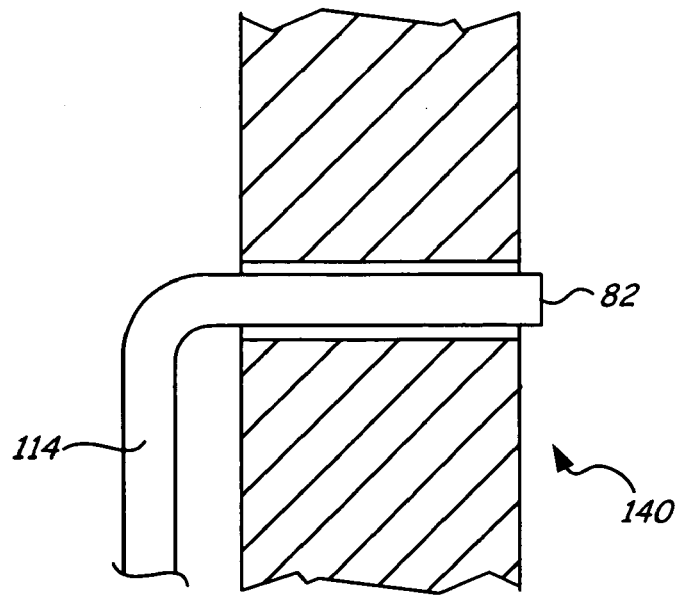
FIG. 13 is a side view of another embodiment of a waveguide rod of the present invention.

FIG. 13 shows a cross-section of waveguide rod 140, which is similar to rod 130 of FIG. 12 except optical fiber 114 is externally mounted.

Waveguide rods 130 and 140 can be located inside process 12 to measure parameters associated with process 12. For example, rods 130 and 140 can be located inside process 12 for contact measurement of condensation occurring within process 12, whereby condensation alters the infrared radiation received by inputs 82.

Thus, as described above, the field device and field device system of the present invention provide a means for monitoring infrared radiation emitted from a plurality of locations associated with a process. The intensity of infrared radiation from selected locations is measured by the present invention and used to generate various outputs. Although the present invention has been described with reference to preferred embodiments, workers skilled in the art will recognize that changes may be made in form and detail without departing from the spirit and scope of the invention.

The invention claimed is:

1. A device for monitoring a process in conjunction with a plurality of optical fibers communicating with locations associated with the process, the field device comprising:
   a plurality of optical input channels for receiving infrared radiation from the locations associated with the process, the input channels capable of coupling to the optical fibers;
   a plurality of infrared sensors, each infrared sensor communicating with one of the input channels to measure an intensity of the infrared radiation received from that input channel and produce an infrared sensor signal representative of the intensity;
   a physical sensor input channel configured to receive a physical sensor signal from a physical sensor, the physical sensor signal representative of a process variable;
   signal conditioning circuitry communicating with the plurality of infrared sensors and the physical sensor input channel to condition the infrared and physical sensor signals;
   a data processor communicating with the signal conditioning circuitry to produce an output that is a function of selected infrared and physical sensor signals; and
   communication circuitry to transmit the output to a remote location.

2. The device of claim 1, wherein the output is representative of a differential temperature measurement.

3. The device of claim 1, wherein the output is a sensor malfunction indication to indicate that one of the plurality of infrared radiation sensors has malfunctioned.

4. The device of claim 1, wherein the data processor is adapted to generate a diagnostic output based on the selected infrared and physical sensor signals.

5. The device of claim 4, wherein the diagnostic output is a sensor malfunction indication.

6. The device of claim 1, wherein the communication circuitry is adapted to communicate the output to the remote location over a current loop.

7. The device of claim 1, wherein the communication circuitry is adapted to wirelessly communicate the output to the remote location.

8. A system for monitoring a process, the system comprising:
   a plurality of optical fibers to receive the infrared radiation from the locations of the process and transmit the infrared radiation to another location;
   a plurality of optical input channels communicating with the optical fibers to receive the infrared radiation from the optical fibers;
   a plurality of infrared sensors, each infrared sensors communicating with one of the input channels to measure an intensity of the infrared radiation received from that input channel and produce an infrared sensor signal representative of the intensity;
   a physical sensor input channel configured to receive a physical sensor signal from a physical sensor, the physical sensor signal representative of a process variable;
   signal conditioning circuitry communicating with the plurality of infrared sensors and the physical sensor;
   a data processor communicating with the signal conditioning circuitry to produce an output that is a function of selected sensor signals; and
   communication circuitry to transmit the output to a remote location.

9. The system of claim 8, wherein at least two of the plurality of optical fibers share a common output so that the infrared radiation transmitted by each optical fiber sharing the common output is combined before entering one of the input channels.

10. The system of claim 8, wherein a selected portion of each of the plurality of optical fibers is secured to a carrier support that includes a mounting device for mounting the carrier support to the process relative to the locations of the process.

11. The system of claim 10, wherein the carrier support comprises a strap.

12. The system of claim 11, wherein the mounting device comprises a fastener for securing one end of the strap to a second end of the strap to circumferentially mount the strap relative to the process.

13. The system of claim 10, wherein the carrier support comprises a rod.

14. The system of claim 8, wherein the data processor is adapted to generate a diagnostic output based on the selected infrared and physical sensor signals.

15. The system of claim 14, wherein the diagnostic output is a sensor malfunction indication.

16. A method for generating an output representative of conditions related to a process, the method comprising:
   receiving infrared radiation from a plurality of locations associated with the process;
   guiding the infrared radiation over a distance;
   combining the infrared radiation into an aggregate infrared radiation signal;
   measuring an intensity of the aggregate infrared radiation signal;
   receiving a physical signal representative of a process variable; and
   producing the output as a function of the intensity of the aggregate infrared radiation signal and the physical signal.

17. The method of claim 16, wherein the infrared radiation is guided over a plurality of optical paths.

18. The method of claim 17, wherein the plurality of optical paths combine to form an aggregate optical path.

19. A device for monitoring a process in conjunction with a plurality of optical fibers communicating with locations associated with the process, the field device comprising:
   a plurality of input channels for receiving infrared radiation from the locations associated with the process, the input channels capable of coupling to the optical fibers;
   a plurality of infrared sensors, each infrared sensor communicating with one of the input channels to measure an intensity of the infrared radiation received from that input channel and produce a sensor signal representative of the intensity;
   signal conditioning circuitry communicating with the plurality of infrared sensors to condition the sensor signals;
   a data processor communicating with the signal conditioning circuitry to produce an output that is a function of selected sensor signals, wherein the output is a sensor malfunction indication to indicate that one of the plurality of infrared radiation sensors has malfunctioned; and
   communication circuitry to transmit the output to a remote location.

20. A system for monitoring infrared radiation associated with locations of a process, the system comprising:
   a plurality of optical fibers to receive the infrared radiation from the locations of the process and transmit the infrared radiation to another location;
   a plurality of optical input channels communicating with the optical fibers to receive the infrared radiation from the optical fibers;
   a plurality of infrared sensors, each infrared sensors communicating with one of the input channels to measure an intensity of the infrared radiation received from that input channel and produce an infrared sensor signal representative of the intensity;
   signal conditioning circuitry communicating with the plurality of infrared sensors and the physical sensor;
   a data processor communicating with the signal conditioning circuitry to produce an output that is a function of selected sensor signals; and
   communication circuitry to transmit the output to a remote location,
   wherein a selected portion of each of the plurality of optical fibers is secured to a strap that includes a mounting device for mounting the strap to the process relative to the locations of the process.

* * * * *